INVENTOR
HARCOURT C. DRAKE
BY
Joseph H. Lipschutz
ATTORNEY

Oct. 6, 1942.     H. C. DRAKE     2,297,879
RAIL FLAW DETECTOR MECHANISM
Filed March 17, 1939     2 Sheets—Sheet 2

INVENTOR
HARCOURT C. DRAKE
BY
*Joseph H. Lipschutz*
ATTORNEY

Patented Oct. 6, 1942

2,297,879

UNITED STATES PATENT OFFICE 2,297,879

RAIL FLAW DETECTOR MECHANISM

Harcourt C. Drake, Hempstead, N. Y., assignor to Sperry Products, Inc., Hoboken, N. J., a corporation of New York Application March 17, 1939, Serial No. 262,356

4 Claims. (Cl. 175—183)

This invention relates to rail flaw detector mechanisms of the type which are employed on rail flow detector cars which operate along the tracks and detect fissures within the rails. The invention relates specifically to the type of rail flaw detector mechanism employed on the Sperry rail flaw detector cars. The principle of the mechanism of said Sperry cars consists in energizing the rail continuously with electric current to establish an electro-magnetic field surrounding the rail, which field is uniform except in the region of flaw. In such regions the field is distorted and said distortions are detected by means of a detector unit consisting of a plurality of pairs of induction coils. The coils of each pair are arranged in tandem and the pairs are staggered across the railhead so as to coact with various portions of the railhead. Arranging the coils in tandem is desirable for detection purposes because first one and then the other coil of each pair of coils will enter a region of flaw to cut a different number of lines of force from the number which is cut in the undistorted field, and thus is generated a differential E. M. F. which after being suitably amplified by a thermionic amplifier may be caused to operate indicators such as a pen on a chart and a paint gun which marks the point of defect on the rail. Arranging the coils of each pair in tandem, however, gives rise to a problem when the detector unit approaches a rail joint. The angle bars, bolts, etc. at such joint create a field of increasing flux density and therefore the leading coil of each pair would reach this field as the detector unit approached the joint and therefore a differential E. M. F. would be generated, as in the case of an internal fissure. This condition being undesirable, means are provided for cutting out the action of the indicator mechanism when the leading coil of a pair of detector coils reaches the field of increasing flux density caused by the rail joint. For this purpose, the Sperry rail flaw detector cars are provided with joint cut-out fingers, as shown in applicant's Patent No. 2,069,030, granted January 26, 1937. The use of such device, however, means that there is a portion of the rail in advance of the rail joint which remains untested. Similarly, there is a portion of rail beyond each rail joint which remains untested because the indicating mechanism must remain cut out until the last coil of each pair has passed beyond the field of increased flux density caused by the rail joint. Fissures sometimes occur within this region adjacent the angle bar of the rail joint and these are not detected, by reason of the joint cutout mechanism described above.

It is one of the principal objects of this invention to provide means whereby the above described portions of the rail adjacent the ends of the angle bars of the rail joint will be tested for internal defects. For this purpose it is necessary to provide means which will be unaffected by the increased flux density caused by the rail joint while at the same time responding to variations in flux density caused by the presence of internal defects.

It is a further object of my invention to provide a flaw detector mechanism which shall be unaffected by movements thereof laterally with respect to the railhead.

It is a further object of my invention to provide a flaw detector mechanism of the type described which shall not be appreciably affected by relatively small changes in sensitivity while at the same time remaining efficient to detect internal defects and distinguishing the same from surface defects.

Further objects and advantages of this invention will become apparent in the following detailed description.

Figure 4:
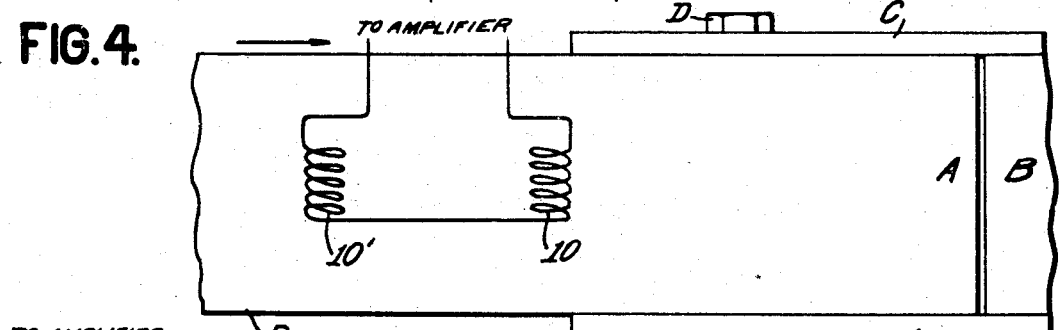
Fig. 4 is a diagrammatic view illustrating the theory underlying the invention.

Referring first to Fig. 4, there is shown a portion of a rail joint for uniting rail ends A and B. Such rail joint consists among other things of angle bars C joined by bolts D as well as other mechanisms not shown. It is quite apparent that when current is passed longitudinally through the rail an electromagnetic field is set up surrounding the rail, which field would have a different flux density in the region of angle bars C than in the portion of the rail R removed from the joint. In the Sperry rail flaw detector mechanism, current is passed progressively and continuously through the rail, as disclosed in my said Patent No. 2,069,030, and hence such field will be uniform in portion of rail A except where there is present an internal defect or in the region of the rail joint. Internal defects within rail R are designed to be detected by means of one or more pairs of induction coils 10, 10' carried by the car at a constant distance above the railhead, so that said coils normally cut a constant number of lines of force, but on entering a region of internal flaw first coil 10 and then coil 10' will cut a different number of lines of force to create a differential E. M. F., which E. M. F. leads to a thermionic amplifier the output of which may be caused to operate suitable indicators. It is quite apparent also that on entering the region of increased flux density caused by the rail joint, coil 10 would similarly cut a different number of lines of force from coil 10' on entering such region and there would be generated a differential E. M. F. Similarly, on leaving the region of increased flux density caused by the rail joint, a differential E. M. F. would again be generated. These differential E. M. F.'s, however, not being due to internal defects, are therefore false indications which it is not desirable to obtain and hence the necessity for employing the joint cutout mechanism described in my said Patent No. 2,069,030 which cuts out the action of the indicators when coil 10 approaches the region of increased flux density caused by the rail joint, and maintains said indicators cut out until coil 10' has left the region of increased flux density caused by said joint. Such cut-out mechanism becomes effective when coil 10 is several inches removed from the leading edge of angle bars C, and hence there is a region in advance of said angle bars which remains untested. Similarly, there is a region beyond said angle bars of the same extent which remains untested. Within said regions, fissures sometimes occur and, as stated in the introduction, it is an object of the present invention to provide means for testing these regions.

In order to accomplish the above purpose, I provide in addition to the pair or pairs of coils 10, 10' which constitute the standard detector unit in the Sperry rail flaw detector car, a pair of coils 20, 20' (see Fig. 1) arranged in axial alignment laterally across the railhead instead of in tandem as in the case of the standard pairs of coils 10, 10'. The coils 20 and 20' are oppositely connected and the output from said coils extends into an amplifier A which may be a separate amplifier from that into which the output of coils 10, 10' extends, or it may be a separate input channel into the same amplifier. The output of the amplified impulse from coils 20, 20' may operate a suitable indicator such as a pen P on a moving chart T. This pen P may be in addition to, and operate upon the same chart T, as other pens controlled by the amplified output from coils 10, 10'. The coils 20 and 20' are arranged in advance of the pairs of coils 10, 10'.

The action of the auxiliary pair of coils 20, 20' in permitting testing of that region which normally goes untested because of the joint cut-out mechanism in the standard Sperry equipment, will now become apparent. The indicator P controlled by coils 20, 20' is not affected by the joint cut-out mechanism, but, on the contrary, remains effective at all times. On entering the region of increased flux density caused by the rail joint, the coils 20, 20' will not be affected as would be coils 10, 10' because said coils 20, 20' are not arranged in tandem but on the contrary are arranged in axial alignment laterally with respect to the rail. Any increase in flux density caused by the rail joint will have no effect upon the output of coils 20, 20' because coil 20 is affected equally and oppositely to coil 20' and therefore the output from said coils is zero. However, should a fissure be present, one coil will be affected more than the other coil in every case except the case where a fissure is positioned exactly symmetrical with respect to coils 20, 20'. Since the latter type of fissure does not occur very frequently, it means that by the use of auxiliary coils 20, 20' in advance of the main detector coils, practically all fissures which would ordinarily occur in the heretofore untested region adjoining rail joints will now be discovered.

The reason that coils 10, 10' are arranged in tandem and not in the manner of coils 20, 20' has already been stated above, namely, that it is desired to detect all fissures in the main portion of the rail including those which are located centrally of the railhead. For this purpose, not only are the coils 10, 10' arranged in tandem, but a plurality of pairs of coils is employed in order to coact with different portions of the railhead.

Figure 1:
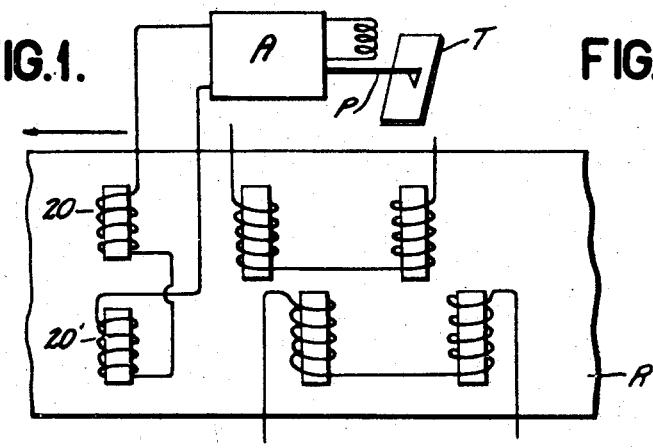
Fig. 1 is a plan view of a portion of railhead with a diagrammatic representation of the mechanism constituting one form of this invention.
Figure 2:
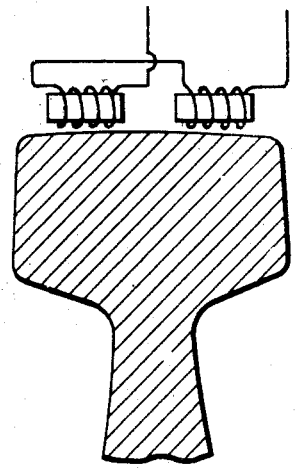
Fig. 2 is a vertical section through the railhead, showing a front elevation of the mechanism.
Figure 3:
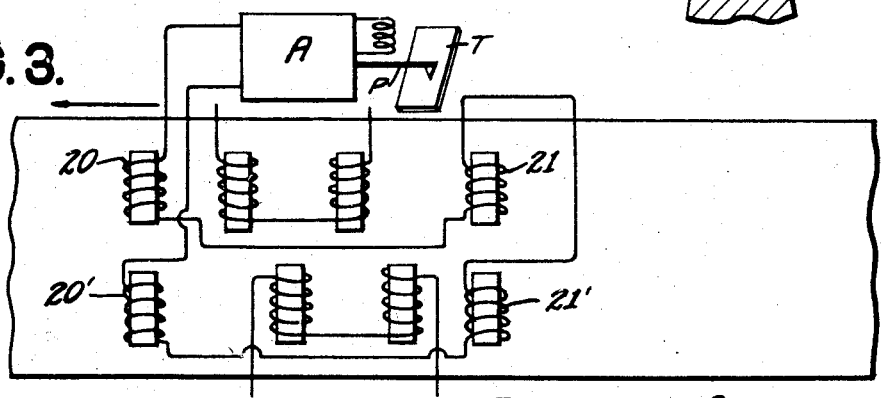
Fig. 3 is a view similar to Fig. 1 showing a modified form of this invention.

There is a certain objection to the use of the Fig. 1 form which may arise, and that is if the equipment is not so designed as to prevent lateral movement of detector mechanism relative to the railhead, then it will be seen that such lateral movement would cause one of the coils 20, 20' to move into a region of lesser density while the other coil moves into a region of greater density each time that the said pair of coils is moved laterally with respect to the railhead. To obviate this condition I may provide two pairs of coils 20, 20' and 21, 21', (see Fig. 3), each pair being arranged in axial alignment, one of said pairs in advance of the standard detector mechanism and the other of said pairs to the rear of said standard mechanism. In addition, the coil 20 is connected oppositely to coil 21 and coil 20' is connected oppositely to coil 21'. Coil 20 is, of course, equal in inductance and opposite to coil 20' and coil 21 is equal in inductance and opposite to coil 21'. It will now be seen that should the detector mechanism move laterally with respect to the railhead, both coils 20 and 21 would move into a region, let us say, of lesser density and would be equally and oppositely affected so that the net result on the output of said coils would be zero. Similarly, coil 20' and coil 21' would at the same time move into a region of greater density (in the example chosen) and would be equally and oppositely affected so that the output from this pair of coils would be zero. Hence the output from the two pairs of coils due to movement of the detector mechanism laterally with respect to the railhead would be zero while at the same time each pair of coils 20, 20' and 21, 21' would be effective to pick up any fissure which affected one coil of each pair differently from the other coil of said pair.

The principle of my invention described above which permits testing close to joints while at the same time causing the detector mechanism to be unaffected by movement laterally of the rail, may be applied also to the distributed winding type of detector described by me in my Patent No. 2,206,768, granted July 2, 1940. In said patent I disclosed a detector mechanism wherein the leading coil, such as 30, (see Fig. 5), is counterbalanced by a plurality of coils 31, the inductance of coil 30 being equal to the sum of the inductances of coils 31. As described in said patent, this enables testing to be done close to the joints by coil 30 because there is no need for adding the impulse from another coil to the impulse from coil 30 in order to operate the indicator. At the same time, the construction is such that surface defects are minimized. It may be desirable to employ two sets of distributed windings similar to 30, 31 so that the second set 32, 33 may be employed, each set coacting with a different portion of the railhead. It is desirable that the portions tested by each coil 30, 32 overlap in order that centrally located fissures may be more readily detected. Therefore, I have provided that coils 30 and 32 coact with overlapping portions of the railhead but the counterbalancing coils 31 and 33 do not overlap. In other words, portion x of coil 30 is counterbalanced by the coils 31, and portion y of coil 32 is counterbalanced by the coils 33; but portion z of coil 30 is counteracted by position z' of coil 32. Not only are coils 31 connected in opposition to portion x of coil 30, but said coils 31 are connected in opposition to coils 33. Portion y of coil 32 is connected in opposition to coils 33. With this arrangement, it will be seen that fewer turns are required on coils 31 and 33 to counteract coils 30 and 32 and therefore shorter coils may be employed and each coil 31 and a corresponding coil 33 may be wound upon the same core. Further, this construction means a path of lesser resistance and hence a more sensitive circuit. With this arrangement it will be seen that should any lateral movement of the detector mechanism take place with respect to the railhead, no output would result because should the detector mechanism move so that coil 30 and coils 31 move laterally into a region of lesser density while coil 32 and coils 33 move into a region of greater density, the E. M. F. induced in portion x of coil 30 will be equal and opposite to the same E. M. F.'s induced in coils 31, the E. M. F. in portion y of coil 32 will be equal and opposite to the E. M. F.'s induced in coils 33, and the E. M. F. induced in portion z of coil 30 will be equal and opposite to the E. M. F. induced in portion z of coil 32, and hence no output will be obtained in response to lateral movement of the detector mechanism.

Figure 5:
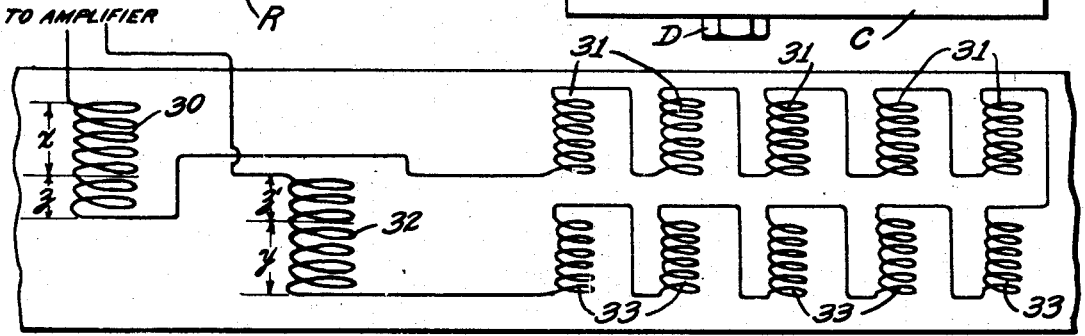
Figs. 5 to 8 are views similar to Figs. 1 and 3, showing the principle of the invention applied to modified forms of detector mechanism.

In Fig. 5 the detector unit is shown as consisting entirely of coils having air cores which have the desirable property of not picking up surface defects while responding to internal defects. The disadvantage inherent in air core units of this type resides in the fact that they operate at very low sensitivity, for example, approximately 1.4 mils in the Sperry equipment. In the course of an operating day the sensitivity may vary as much as .2 or .3 mil, and it will be seen that this variation is a large percentage of the 1.4 mils which is its normal sensitivity. Such wide variations in sensitivity may result in failure to pick up certain fissures which might otherwise be detected. If metal core coils are employed, such coils operate at a sensitivity of approximately 10 mils, and it will be seen that should the sensitivity in the course of operation vary by as much as .2 or .3 mil, this would be a very small proportion of the 10 mils normal sensitivity and therefore the testing efficiency would not be greatly impaired by reason of the variation in sensitivity.

Figure 6:
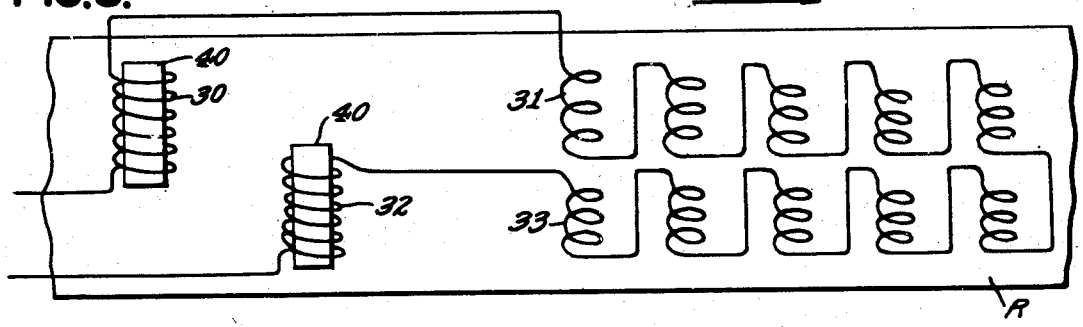

I have found that when employing a unit such as shown in Fig. 6 I can obtain desirable results by having the leading or detecting coils 30 and 32 provided with metal cores 40 while the balancing coils 31 and 33 have air cores. In this manner the main detector coils 30 and 32 will not have their operation impaired by variations in sensitivity while the balancing coils 31 and 33, being only for the purpose of balancing and not for the purpose of detection, will not be greatly varied in their operation by reason of a change in sensitivity.

Figure 7:
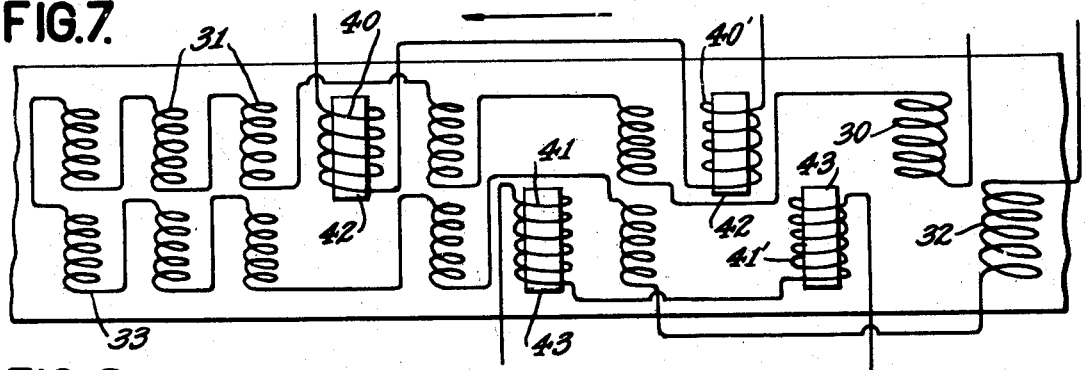

In another modification as shown in Fig. 7, I may retain the advantages of an all-air-core system as shown in Fig. 5, said advantages being insensitivity to surface defects while responding to internal defects, and at the same time retaining the advantages of a metal core detector coil, which advantage is relative stability in detection irrespective of normal changes in sensitivity. For this purpose I have shown a standard detector unit comprising two pairs of opposed detector coils 40, 40' and 41, 41', each pair extending into a separate input channel of an amplifying system in the usual manner and said coils being provided with metal cores 42 and 43. In connection with this standard unit there may be employed a unit such as disclosed in Fig. 5 consisting of main pick-up coils 30 and 32 with a series of counterbalancing coils 31 and 33 as described in connection with Fig. 5. The said series of coils 30, 31, 32, 33 forms a unit which is unaffected by lateral movement, which consists entirely of air core coils, and which therefore is insensitive to surface defects while responding to internal defects. The output of the air core system may lead into a separate amplifier or into another input channel of the main amplifier.

Figure 8:
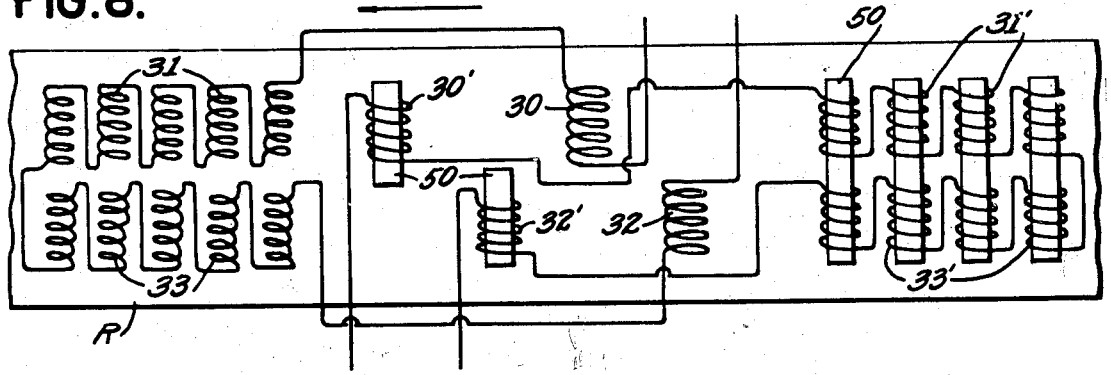

Still another modification is disclosed in Fig. 8, where in addition to the air core coil system 30, 31, 32, 33, a similar distributed winding system is employed, namely, 30', 31', 32', 33', but said latter system having all of the coils provided with metal cores 50. The output from each of said distributed winding detector systems may extend into separate amplifiers or separate input channels of a single amplifier.

In all forms of the invention described hereinbefore there is disclosed the common feature of pairs of coils distributed laterally across the rail, of equal inductance and oppositely wound, whereby said coils are unaffected by lateral movement across the rail while permitting testing close to joints.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A rail flaw detector mechanism adapted to be responsive to variations in an electromagnetic field surrounding the rail, said mechanism comprising a plurality of pairs of induction coils, each pair arranged in tandem along the longitudinal axis of the rail, each of said pairs coacting with a different portion of the railhead, the coils of each pair being of equal inductance and oppositely connected, and a plurality of auxiliary pairs of induction coils, one of said auxiliary pairs coacting with one side of the railhead and the other pair coacting with the other side, each of said pairs comprising one coil in advance and one coil to the rear of said first named pairs of induction coils, the respective advance coils and the respective rear coils being arranged in axial alignment, each coil of said auxiliary pairs being of equal inductance to the other coils and the coils of each pair as well as the pairs of coils being oppositely connected.

2. A rail flaw detector mechanism adapted to be responsive to variations in an electromagnetic field surrounding the rail, said mechanism comprising a plurality of pairs of opposed induction coils arranged in tandem, each pair comprising coils of equal inductance and oppositely connected, each of said coils having a core of magnetic material, and a main coil and a plurality of counter-balancing coils, said main coil and said counter-balancing coils having air cores.

3. A rail flaw detector mechanism adapted to be responsive to variations in an electromagnetic field surrounding the rail, said mechanism comprising a pair of induction coils positioned with their axes in alignment at an angle transverse to the longitudinal axis of the rail, a direct conductive connection between said members extending across the railhead, said coils being of equal inductance and oppositely connected, the differential E. M. F.'s generated by said members being adapted to be impressed upon the input of a thermionic amplifier.

4. A rail flaw detector mechanism adapted to be responsive to variations in an electromagnetic field surrounding the rail, said mechanism comprising a pair of induction coils positioned with their axes in alignment at right angles to the longitudinal axis of the rail, a direct conductive connection between said members extending across the railhead, said coils being of equal inductance and oppositely connected, the differential E. M. F.'s generated by said members being adapted to be impressed upon the input of a thermionic amplifier.

HARCOURT C. DRAKE.